Dec. 22, 1931.   R. H. OWENS   1,837,333
FLUID METER
Filed Jan. 29, 1927   2 Sheets-Sheet 1
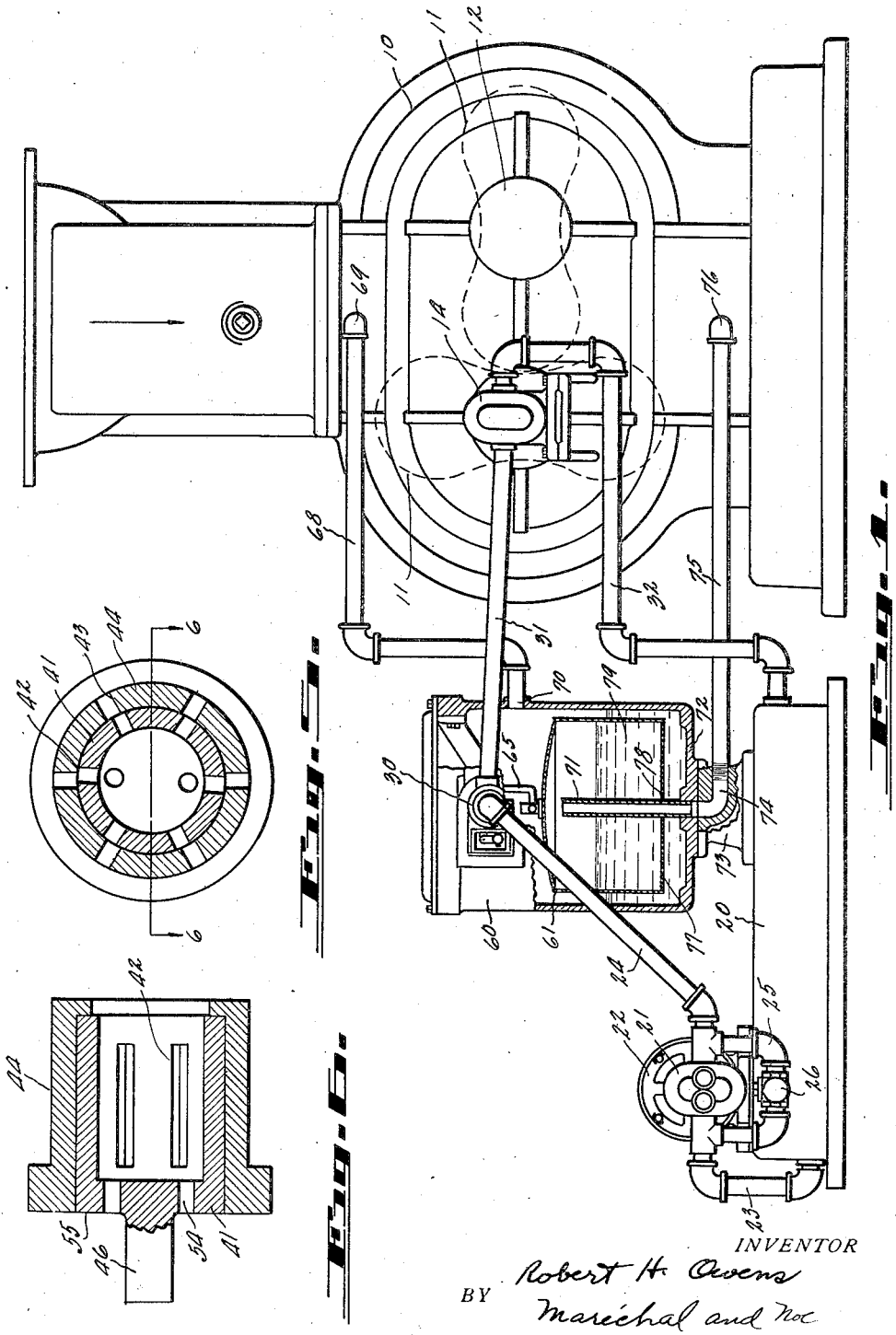
INVENTOR
Robert H. Owens
BY Maréchal and Noc
ATTORNEY Dec. 22, 1931.    R. H. OWENS    1,837,333
FLUID METER
Filed Jan. 29, 1927    2 Sheets-Sheet 2
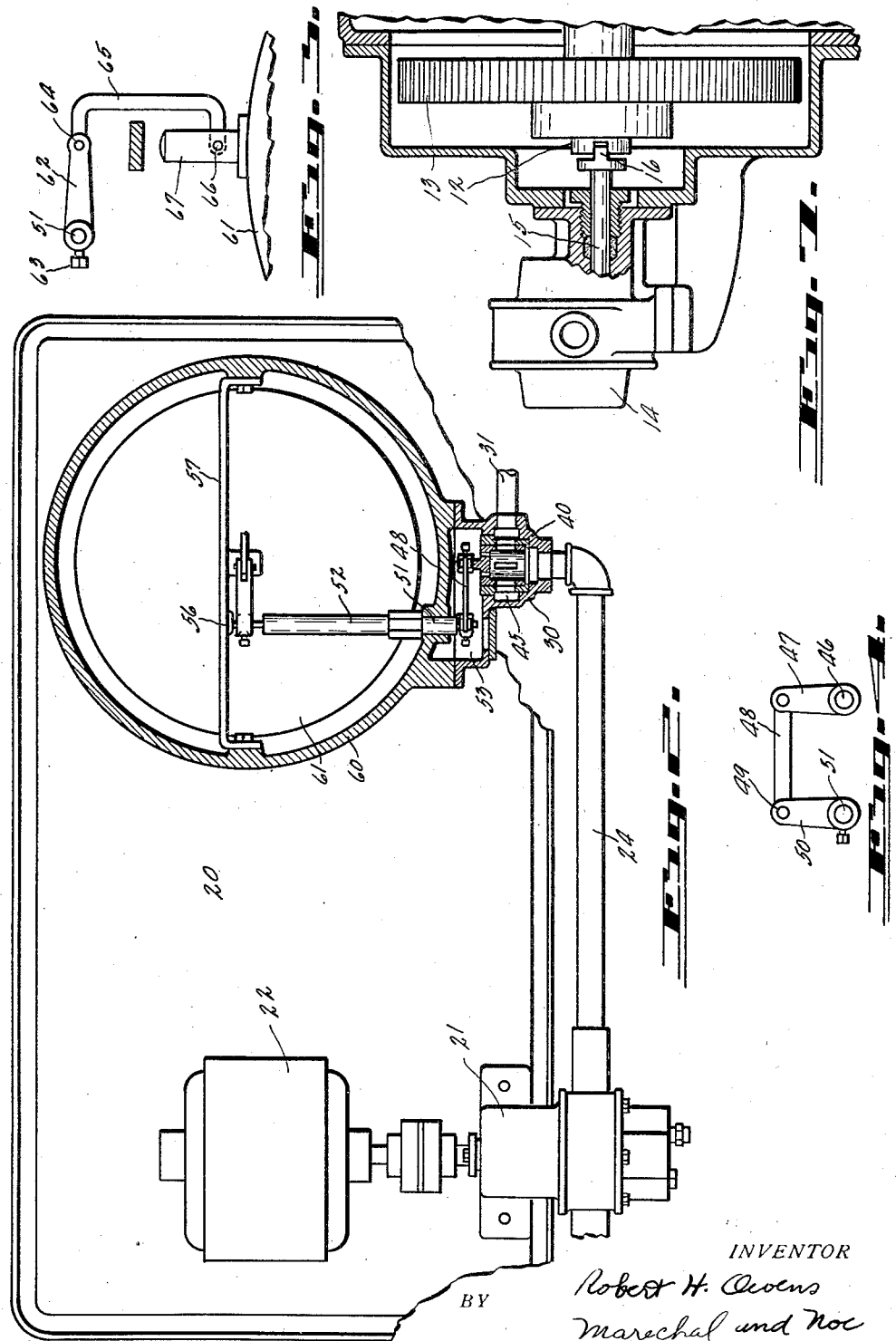
INVENTOR
Robert H. Owens
BY Marechal and Noc
ATTORNEY Patented Dec. 22, 1931

1,837,333

UNITED STATES PATENT OFFICE

ROBERT H. OWENS, OF CONNERSVILLE, INDIANA, ASSIGNOR, BY MESNE ASSIGNMENTS, TO INTERNATIONAL-STACEY CORPORATION, OF COLUMBUS, OHIO, A CORPORATION OF OHIO

FLUID METER

Application filed January 29, 1927. Serial No. 164,491.

This invention relates to fluid metering, and more particularly to fluid-metering instruments having one or more displacement members movably mounted within a casing.

One object of the invention is to provide a fluid-metering instrument having a displacement member which is positively driven in accordance with the flow of fluid through the instrument and whose speed is governed by a control means which is regulated in accordance with relative difference in pressure on opposite sides of the displacement member so that substantially no leakage or slippage will occur past the displacement member.

A further object of the invention is to provide an instrument of this character adapted to meter the flow of a gaseous medium, the operation of which is controlled by a novel mechanism so that a sensitive and delicate control will be effected.

Further objects and advantages of the invention will be more fully set forth in the accompanying specification and drawings wherein the preferred embodiment of the invention is described and illustrated.

In the drawings Fig. 1 is a side elevation partly in section showing the fluid-meter connected to the regulating and control means;

Fig. 2 is a plan view partly in section of the oil reservoir and the regulating means for the instrument;

Fig. 3 is a detail view showing the link connection from the top of the float to the horizontal control shaft;

Fig. 4 is a detail view showing the link connection between the horizontal control shaft and the rotary valve shaft;

Fig. 5 is a transverse section through the rotary valve;

Fig. 6 is a longitudinal section through the rotary valve on the line 6—6 of Fig. 5; and Fig. 7 is a vertical sectional view showing the connection between the fluid motor and one of the timing gears of the instrument.

Referring more particularly to the drawings by reference numerals in which corresponding numerals designate like parts of the instrument, 10 indicates the meter casing which is provided with a pair of intermeshing lobed displacement members 11 each of which is mounted on a rotatable shaft 12 and which interfit one with the other. The two displacement members 11 are shown as of the usual lobed or figure 8 construction and fit snugly within the casing and are supported by suitable bearings, so that when rotated there will be positive displacement or measuring of the gaseous medium passing through the casing. Since the displacement for each revolution is constant the amount of this displacement during any given period may be determined from the number of revolutions of the rotatable intermeshing members. The number of revolutions of the intermeshing members may be counted by a suitable indicating or measuring device which may if desired be operated by a gear train attached to one of the shafts 12 in any suitable manner.

The metering-displacement members are not driven by the passage of the gas through the instrument to operate as a low-powered fluid motor as in the prior constructions of instruments of this character but in accordance with this invention the shafts 12 are positively rotated by an extraneous source of power so that the speed of revolution of the intermeshing members will be such as to produce no leakage or slip. In other words the extraneous power supplied to the shafts 12 will be such as to coordinate the speed of revolutions of the intermeshing displacement members with the rate of flow of the fluid being metered. The two displacement members are properly timed by means of the two intermeshing spur gears 13 which are fixed to the two shafts 12. The shaft of one of these gears is connected to a fluid motor 14 having a driving shaft 15 provided with a projection 16 at its end which fits within a corresponding slot in the end of the shaft 12 with which it is in alignment. The power supplied to the fluid motor 14 is regulated and controlled in accordance with relative differences in pressure on opposite sides of the displacement members so that the extraneous power supplied to the fluid motor will just be sufficient to permit the rotation of the intermeshing members in exact accordance with the amount of gas passing through the instrument.

Upon an oil reservoir or supply tank 20 (see Figs. 1 and 2) is mounted an oil pump 21 which is driven by an electric motor 22 likewise mounted upon the reservoir 20. A supply pipe 23 leads from the bottom of the reservoir 20 to the intake side of the fluid pump 21, as shown in Fig. 1, and a pipe 24 extends from the output side of the fluid-pump 21, a by-pass 25 having an automatically controlled regulator 26 of any suitable character interconnecting the intake and output pipes so that the proper amount of oil may be supplied through the pipe 24 to the rotary control valve designated generally 30. The electric motor 22 which drives the fluid pump 21 is preferably of the constant speed type.

The oil supplied to the pipe 24 passes through the rotary control valve 30 in accordance with the amount of opening through this valve as will be presently explained and then passes through a pipe 31 which leads to the intake side of the fluid motor 14 which may be of the gear-displacement type so that the speed of revolution of the fluid motor 14 is proportional to the amount of fluid passing through it. After passing through the fluid motor the oil is returned through a return pipe 32 to the oil reservoir 20 to be again circulated through the system by the pump 21.

The fluid motor 14 which regulates the speed of revolution of the displacement members of the instrument is controlled by the rotary control valve 30 which is in turn regulated so as to be opened the proper amount by means of a gravity-actuated float mechanism. The rotary valve 30 is enclosed in a small casing 40 mounted on the side of the float chamber 60 which is in turn mounted on the top of the oil reservoir 20. The valve 30 as shown consists of a rotary valve member 41 which is of a hollow cylindrical construction and provided with a series of slots 42 which are adapted to register with a series of slots 43 in an enclosing cylindrical sleeve 44 fixed in any suitable manner within the casing 40. The oil is supplied through the pipe 24 to the interior of the valve member 41 and may then flow through the registering slots 42 and 43 to a peripheral chamber 45 surrounding the slots 43 and communicating with the pipe or passage 31 leading to the motor 14. The amount of fluid passing through the valve is controlled in accordance with the relative positions of the member 41 and sleeve 44. The member 41 is integrally supplied with a stub end shaft 46 to which is firmly attached an arm 47 pivotally connected at its upper end with a horizontal link 48 attached at 49 to an arm 50 rigid with a transverse shaft 51 which is mounted in a long pressure-tight bearing 52 in the side of the float chamber 60. The links and arms 47, 48 and 50 are enclosed in a chamber 53 which is maintained full of oil by means of small fluid passages 54 in the end wall 55 of the rotary valve member 41. The oil maintained in this casing 53 lubricates the connections and joints so that they may operate with a minimum of friction. The shaft 51 is supported at its inner end centrally of the float chamber by a bearing 56 in a transverse strap 57 attached to opposite sides of the float chamber.

This transverse shaft 51 is rotated or controlled by the float 61 so as to rotate the rotary control valve and govern the amount of fluid supplied through it to the fluid motor 14. The control shaft 51 is rocked by means of a link connection to the top of the float as shown in Fig. 3. The arm 62 which is fastened to the shaft 51 by a set screw 63, is connected by a pivot 64 to a vertical bent link 65 the lower end of which is connected by a pivot 66 to a small post 67 projecting upwardly from the top of the float 61. The vertical movements of the float 61 will thus cause a rotation of the shaft 51 which in turn will be transmitted to the rotary control valve to regulate its amount of opening.

The float 61 as shown is a bell of the Huntoon type, the tank or casing 60 being sealed pressure tight with the exception of the control passages which are connected to the inside and outside of the float for governing its operation. The outside of the float 61 is under a pressure corresponding to the inlet side of the gas meter and for this purpose a pipe 68 is connected at 69 on the inlet side of the displacement members of the meter and opens at its opposite end at 70 into the upper portion of the float chamber 60. Extending up into the float is a small vertical pipe 71 which is open at its upper end and which fits tightly in the bottom wall 72 of the float chamber. The pedestal 73 on which the float chamber is mounted is provided with a passage 74 communicating with a pipe 75 which extends to the outlet side of the meter at 76 so that the pressure of the fluid at the outlet side of the displacement members 11 will be the same as the pressure within the float 61. This float is provided with a bottom wall 77 having a small opening 78 within which loosely fits the vertical pipe 71. The opening 78 thus serves to guide the float in its vertical movements so as to maintain it centrally in the chamber 60 and also serves as a restricted by-pass for the sealing liquid 79 which is provided within the lower portion of the float and within the bottom portion of the float chamber 60 as shown in Fig. 1 to act as a liquid seal between the gas pressure within the float and the gas on the inside of the float chamber. The two gases on the inside and the outside of the float being under pressure corresponding to the outlet and inlet sides of the gas meter thus control the liquid levels inside and outside of the float and regulate the position of the float to properly govern the opening of the rotary valve and permit the passage of the proper amount of oil to the fluid motor 14. The displacement members of the meter are therefore rotated at a speed to produce no slip or leakage past the displacement members. If a slip occurs or tends to occur due to an excess or a deficiency in the operating liquid supplied to the fluid pump 14 the relative difference in pressure between the inlet and the outlet sides of the gas meter will create a relative difference in pressure between the inside and the outside of the float thus causing more or less of the liquid 79 to be drawn into or expelled from the inside of the float 61 through the small restricted opening 78 in its bottom wall. The float will thus be moved vertically to correct the opening of the rotary valve and control the power supplied to the fluid motor.

The system is in balance and operates properly to produce no slip or leakage past the displacement members when there is a zero differential in pressure between the inlet and outlet sides of the meter and when this condition exists the float 61 is maintained in a balanced condition with the rotary valve open the proper amount to cause the proper functioning of the apparatus. The restricted opening 78 permits a damped action of the float and prevents an excessive fluctuation and erratic operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a fluid-metering instrument, a casing having inlet and outlet portions, displacement means in said casing, and mechanism for driving said displacement means in accordance with the flow of fluid through the instrument including driving means for said displacement means and control means for said driving means, said control means comprising a float chamber containing liquid, a bell float in the chamber sealed by the liquid, means operated by said float for governing said driving means, and fluid connections from the inside and outside of said float to the outlet and inlet portions of said casing.

2. In a fluid-metering instrument, a casing having inlet and outlet portions, displacement means in said casing, and mechanism for driving said displacement means in accordance with the flow of fluid through the instrument including driving means for said displacement means, a fluid supply connection for said driving means, a pressure-responsive member having connections to the casing so as to be operated by differences in pressure between the inlet and outlet sides of the instrument, a rotary valve having mechanical connection to said pressure-responsive member, said rotary valve being provided in said fluid supply connection for controlling the supply of fluid to said driving means.

3. In a gas-metering instrument of the class described, a casing having inlet and outlet portions, a pair of rotatable lobed intermeshing displacement means in said casing, a pair of timing gears therefor, a fluid motor for operating one of said timing gears in accordance with the fluid flow through the instrument, a rotary valve for controlling the flow of fluid to said fluid motor, means for causing a flow of fluid to said fluid motor, and a float having connections to the casing so as to be responsive to relative differences in pressure between the inlet and outlet sides of said casing, and a connection between said float and said rotary valve for causing the displacement means to be rotated at a speed to produce substantially no leakage past the said displacement means.

4. Fluid-handling apparatus of the class described comprising rotary displacement means, a motor having a driving connection to said means for driving said means in accordance with the flow of fluid through the instrument, control means for said motor, and regulating means for said control means comprising a float chamber, a hollow float therein, a fluid passage from said chamber to one side of said displacement means, a vertical pipe extending up into the float and connected to the other side of said displacement means, said float having a restricted opening at its bottom and being relatively movable with respect to said pipe, a liquid seal in the bottom of the chamber and float, and connections from the top of the float to said control means.

In testimony whereof I hereto affix my signature.

ROBERT H. OWENS.